J. H. McCLAREN.
BRAKE LEVER.
APPLICATION FILED MAY 12, 1908.
912,595.
Patented Feb. 16, 1909.
2 SHEETS—SHEET 1.
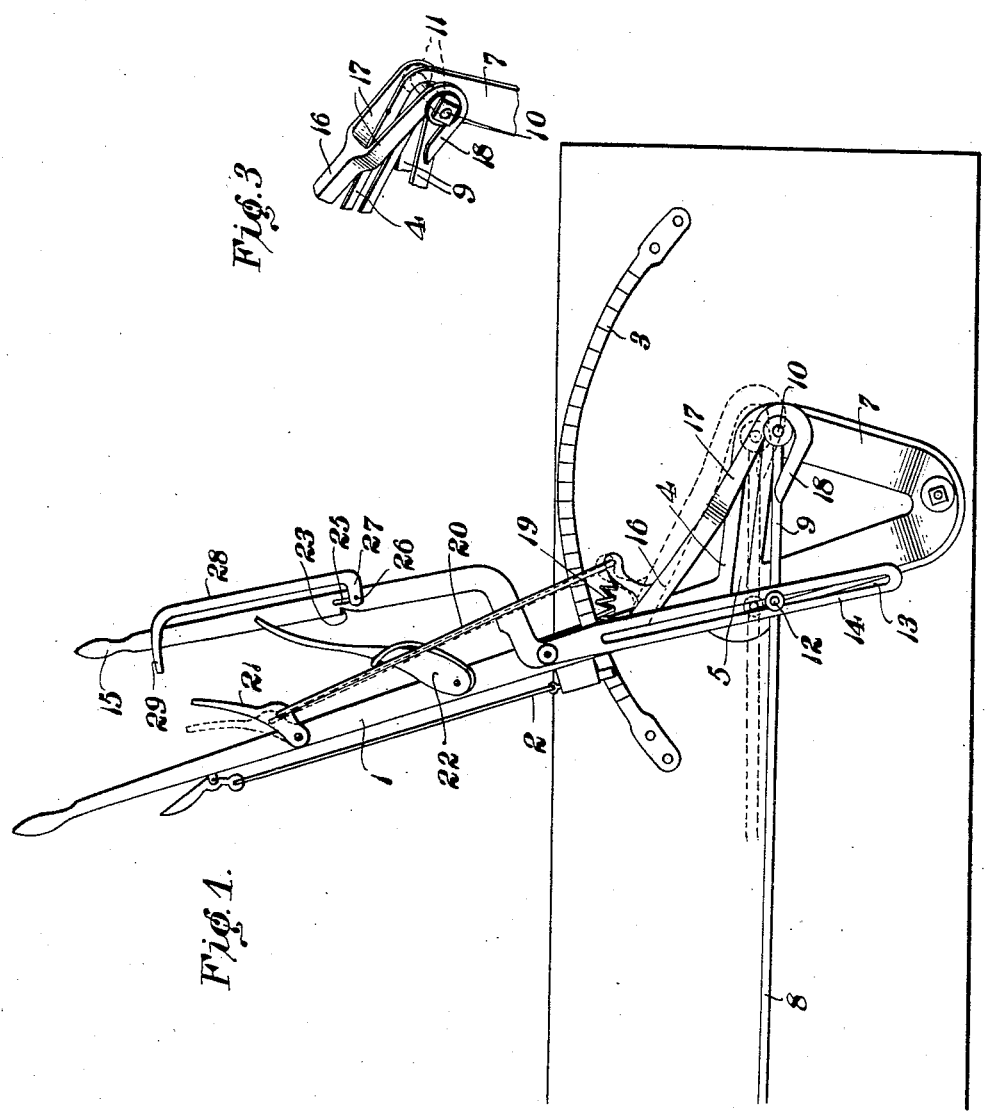
Inventor
J. H. McClaren J. H. McCLAREN.
BRAKE LEVER.
APPLICATION FILED MAY 12, 1908.
912,595.
Patented Feb. 16, 1909.
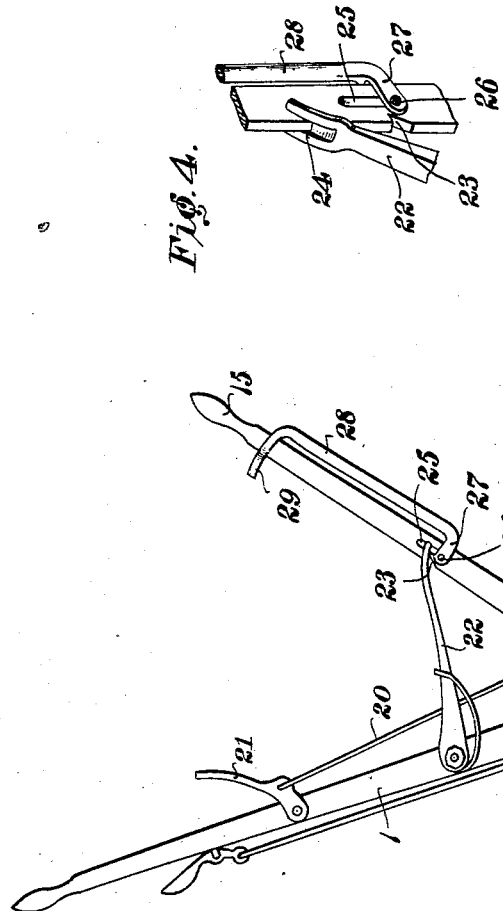
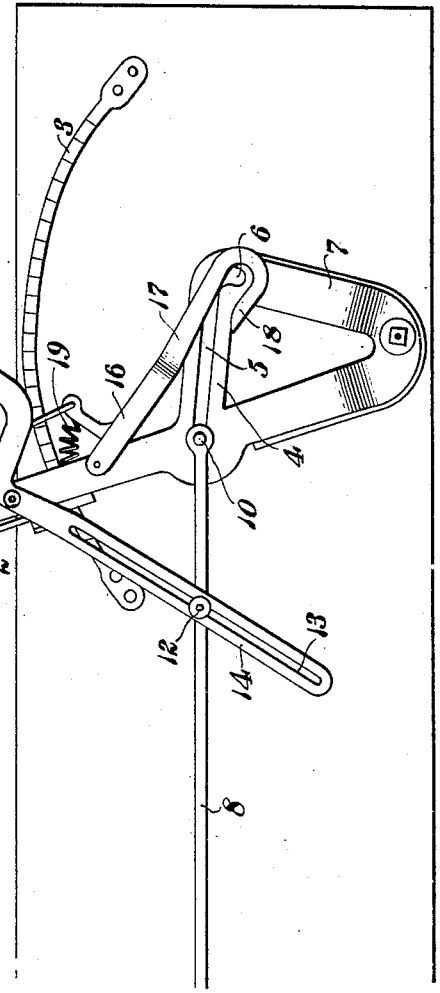
Inventor
J. H. McClaren,
Witnesses
By
Attorneys

UNITED STATES PATENT OFFICE.

JOHN H. McCLAREN, OF WEST UNION, OHIO.

BRAKE-LEVER.

No. 912,595.      Specification of Letters Patent.      Patented Feb. 16, 1909.

Application filed May 12, 1908. Serial No. 432,474.

*To all whom it may concern:*

Be it known that I, JOHN H. McCLAREN, citizen of the United States, residing at West Union, in the county of Adams and State of Ohio, have invented certain new and useful Improvements in Brake-Levers, of which the following is a specification.

This invention contemplates certain new and useful improvements in operating levers of the manual type, and the object of the invention is an improved device of this character which is adapted particularly for use in connection with the brake mechanism of a vehicle, and which embodies peculiar means for effecting the maximum movement of the brake rod whereby to hold the brake shoes against the wheels with greater force, or when the brake shoes are not in use, in greater spaced relation to the wheels.

With this and other objects in view that will more fully appear as the description proceeds, the invention consists in certain constructions and arrangements of the parts that I shall hereinafter fully describe, and then point out the novel features thereof, in the appended claims.

For a full understanding of the invention and the merits thereof, and to acquire a knowledge of the details of construction, reference is to be had to the following description and accompanying drawings, in which:

Figure 1 is a view in elevation of my improved operating device; Fig. 2 is a similar view illustrating the use of the secondary lever; Fig. 3 is a detail view in perspective, of the bifurcated end of the elbow lever, showing its engagement with the bolt; Fig. 4 is a similar view of the lower end of the trip bar and the free end of the detent.

Corresponding and like parts are referred to in the following description, and indicated in all the views of the drawings, by the same reference characters.

My improved device embodies a main lever 1 which is fulcrumed at its lower end on a suitable support, such as the side of a wagon box, and which is provided near its upper end with a spring catch 2 that is of any desired construction, and is arranged to engage a segment 3 carried by the support, to hold the lever in any desired adjusted position. This lever is formed intermediate of its ends and below the segment 3 with a forward extension 4 which is disposed downwardly toward the lower end of the lever, and which is formed with a longitudinal slot 5 that is enlarged at its forward end, as indicated at 6, a brace 7 connecting the forward end of the extension with the lower end of the lever 1, to strengthen the former.

8 designates a brake rod, the forward end of which is bifurcated, as indicated at 9, so as to embrace the main lever 1, with its bifurcations extending forwardly therebeyond, and being connected by a bolt 10 that is mounted in the slot 5 in the extension, to slidingly connect the brake rod thereto, the ends of said bolt projecting laterally beyond the bifurcations, as indicated at 11. One of the bifurcations 9 of the brake rod, is provided with an outstanding stud 12 that is mounted in a slot 13 formed in the lower arm 14 of a secondary lever which is fulcrumed intermediate of its ends on the main lever 1, and which has its upper arm 15 preferably forwardly offset, as shown. The upper arm 15 is designed to be moved forwardly and rearwardly relative to the main lever 1, so as to exert a rearward or forward tension upon the brake rod and effect the desired movement of the bolt 10 in the slot 5. When the bolt 10 is positioned at the forward end of the slot 5, it is received in the enlarged portion 6 thereof and is thus effectually held against any rearward displacement, it being therefore necessary to raise the bolt in the enlarged portion 6, before it is possible to move the bolt against the rear end of the slot by the proper manipulation of the secondary lever. In order to raise the bolt in the enlarged portion, I provide an elbow lever 16 which is fulcrumed near its elbow on the main lever 1, and the lower arm of which is provided with two bifurcations 17 which are disposed downwardly on opposite sides of the extension 4, and the extremities of which are returned upon themselves to constitute hooks 18 that are arranged to engage the projecting ends 11 of the bolt 10 when the latter is positioned in the enlarged portion 6, an expansion spring 19 being interposed between the rear arm of the elbow lever and the main lever 1, so as to normally hold the hooks below the upper wall of the slot 5 and thus lock the bolt 10 in the enlarged portion 6. A connecting rod 20 is pivotally secured at one end to the upper arm of the elbow lever 16, and at its other end to a releasing lever 21 which is fulcrumed at one end on the main lever 1 near the upper end thereof, and which is adapted to be swung upwardly to rock the elbow lever 16 against the tension of the expansion spring 19, and thus raise the bolt 10 in the enlarged end of the slot, after which the forward movement of the upper arm 15 of the secondary lever, will move the bolt against the rear end of the slot.

In order to hold the bolt 10 against forward displacement when it is positioned against the rear end of the slot, I provide a spring actuated detent 22 which is fulcrumed at one end on the main lever 1, and the other or free end of which is held against the rear edge of the upper arm 15 of the secondary lever, and is arranged to spring into engagement with a notch 23 in said edge, when the secondary lever has been swung forwardly relative to the main lever 1, the free end of the detent being forked, as indicated at 24, so as to embrace said upper arm and hold the detent against lateral displacement. The upper arm 15 of the secondary lever, is formed with a slot 25 which extends above and below the notch 23, and in which is mounted a transverse stud 26 that extends between the bifurcations 27 formed at the lower end of a trip bar 28, the other end of said trip bar being mounted upon the upper arm of the secondary lever near the upper end thereof, and being rearwardly disposed to form a finger grip 29, by means of which the trip bar may be readily moved upwardly to cause the bifurcations 27 thereof to bear against the forked portions 24 of the detent, and swing the latter out of engagement with the notch 23, and thus release the secondary lever and permit the same to be manipulated to swing the bolt 10 forwardly in the slot 5.

In the practical use of my improved brake operating device, when it is desired to swing the brake shoes into an inoperative position away from the wheels, the main lever 1 is swung toward the rear end of the segment 3, to effect the rearward movement of the brake rod 8. The releasing lever 21 is then swung upwardly to raise the bolt 10 in the enlarged portion 6 of the slot 5, and the upper arm 15 of the secondary lever is swung forwardly relative to the main lever 1, so as to exert a rearward tension upon the brake rod and move the bolt against the rear end of the slot, to effect the further rearward movement of the brake rod, and thus swing the brake shoes further away from the wheels, to effect a greater clearance therefor. The detent 22 automatically engages the upper arm 15 of the secondary lever, upon the forward movement of the same, and locks the secondary lever in such position, so as to effectually hold the bolt 10 against any forward displacement. When it is desired to apply the brake shoes to the wheels, the trip bar 28 is moved upwardly to disengage the detent from the upper arm 15 of the secondary lever, and the latter is swung rearwardly relative to the main lever 1, so as to move the bolt 10 forwardly through the slot 5 to the enlarged end 6 thereof, and thus exert a forward tension upon the brake rod, the main lever 1 being then moved toward the forward end of the segment, to effect the continued forward movement of the brake rod, and swing the brake shoes forcibly against the wheels.

It will be noted that as the bolt 10 is nearer the fulcrumed point of the main lever, when positioned in the enlarged portion of the slot than when at the rear end thereof, the shifting of the bolt into such enlarged portion before the movement of the main lever 1 toward the forward end of the segment to effect the application of the brake shoes, renders it possible to obtain greater power or leverage upon the brake rod.

Having thus described the invention, what I claim is:

1. In an operating device, the combination of a main hand lever formed with a slot angularly disposed to the longitudinal axis thereof, a rod having a sliding connection at one end with the slot, and means carried by the lever and connected to the rod and arranged to shift the latter in the slot, as and for the purpose specified.

2. In an operating device, the combination of a main lever formed with an angularly disposed extension having a longitudinal slot, a rod having a sliding connection at one end with said slot, and a secondary lever fulcrumed on the main lever and connected to said rod and arranged to move the end thereof in the slot.

3. In an operating device, the combination of a main lever formed with a slot, a rod having a sliding connection at one end with said slot, and formed near such end with an outstanding stud, and a secondary lever fulcrumed intermediate of its ends on the main lever and formed in one arm with a slot in which the stud is mounted.

4. In an operating device, the combination of a main lever formed with a slot, a rod having a sliding connection at one end with said slot, a secondary lever fulcrumed on the main lever and connected to said rod, said secondary lever being arranged to move said end of the rod toward the nearer end of the slot, and means for holding said rod against said end of the slot.

5. In an operating device, the combination of a main lever formed with a slot, a rod provided at one end with a bolt slidingly mounted in the slot, a secondary lever fulcrumed intermediate of its ends on the main lever, one arm of said lever having a sliding connection with the rod and the other arm of said lever being formed with a notch, and a spring actuated detent fulcrumed on the main lever and arranged to be engaged in the notch, as and for the purpose specified.

6. In an operating device, the combination of a main lever formed with a slot, a rod provided at one end with a bolt slidingly mounted in the slot, a secondary lever fulcrumed intermediate of its ends on the main lever, one arm of said last named lever having a sliding connection with the rod, and the other arm of said lever being formed with a notch, and a spring actuated detent fulcrumed at one end on the main lever and arranged for engagement at its other or free end with the notch, the free end of said detent being forked to embrace the secondary lever, as and for the purpose specified.

7. In an operating device, the combination of a main lever formed with a slot, a rod provided at one end with a bolt slidingly mounted in the slot, a secondary lever fulcrumed intermediate of its ends on the main lever, one arm of said last named lever having a sliding connection with the rod and the other arm of said lever being formed with a notch, a spring actuated detent fulcrumed on the main lever and arranged for engagement with the notch, and means carried by the secondary lever for disengaging the detent from the notch.

8. In an operating device, the combination of a main lever formed with a slot, a rod having a sliding connection at one end with the slot, a secondary lever fulcrumed intermediate of its ends on the main lever, one arm of said secondary lever having a sliding connection with the rod and the other arm of said lever being formed with a notch, a spring actuated detent fulcrumed at one end on the main lever and having its other end arranged for engagement with the notch, and a trip bar carried by said last named arm of the secondary lever and adapted to disengage the free end thereof from the notch.

9. In an operating device, the combination of a main lever formed with a slot, a rod having a sliding connection at one end with the slot, a secondary lever fulcrumed intermediate of its ends on the main lever, one arm of said secondary lever having a sliding connection with the rod and the other arm of said lever being formed with a notch and with a slot contiguous to said notch, a spring actuated detent fulcrumed at one end on the main lever and having its free end arranged for engagement with the notch, the free end of said detent being forked to embrace said secondary lever, a trip bar mounted on said last named arm of the secondary lever and bifurcated at one end, and a stud extending between said bifurcations and mounted in the slot in said arm of the secondary lever and arranged to permit a limited movement of the trip bar, to cause the bifurcations thereof to bear against the forked portions of the detent to disengage the same from the notch.

10. In an operating device, the combination of a main lever formed with a slot, a rod having a sliding connection at one end with the slot, a secondary lever fulcrumed on said main lever and connected to said rod so as to move said end thereof toward the far end of the slot, and means for retaining said end of the rod in position at said end of the slot, as and for the purpose specified.

11. In an operating device, the combination of a main lever formed with a slot enlarged at its far end, a rod having a sliding connection at one end with the slot, and a secondary lever fulcrumed on the main lever and connected to the rod, so as to move said end thereof into the enlarged end of the slot.

12. In an operating device, the combination of a main lever formed with a slot enlarged at its far end, a rod slidingly mounted at one end in the slot and arranged to be received in the enlarged end thereof, a secondary lever fulcrumed on the main lever and connected to the rod so as to move said end thereof in the slot, and means for raising said end of the rod in the enlarged end of the slot, as and for the purpose specified.

13. In an operating device, the combination of a main lever formed with a slot enlarged at its far end, a rod slidingly mounted at one end in the slot and arranged to be received in the enlarged end thereof, a secondary lever fulcrumed on the main lever and connected to the rod so as to move said end thereof in the slot, a hook carried by the main lever and arranged for engagement with said end of the rod, and means for swinging said hook to raise said end of the rod in the enlarged portion of the slot.

14. In an operating device, the combination of a main lever formed with a slot enlarged at its far end, a rod slidingly mounted at one end in the slot and arranged to be received in the enlarged end thereof, a secondary lever fulcrumed on the main lever and connected to the rod so as to move said end thereof in the slot, means for raising said end of the rod in the enlarged end of the slot, an elbow lever fulcrumed at its elbow on the main lever, one arm of said elbow lever carrying a hook arranged for engagement with said end of the rod, an expansion spring interposed between the other arm of the elbow lever and the main lever and normally holding the hook below the upper wall of the slot, and means for carrying the elbow lever against the tension of the spring, whereby to raise the said end of the rod in the enlarged portion of the slot.

15. In an operating device, the combination of a main lever formed with a slot enlarged at its far end, a rod bifurcated at one end to embrace the main lever, a bolt mounted in the slot and extending between said bifurcations and projecting laterally therebeyond, said bolt being arranged to be received in the enlarged portion of the slot, a secondary lever fulcrumed on the main lever and having a connection at one end with the rod, so as to exert a tension upon the same to move the bolt against the near end of the slot, an elbow lever fulcrumed at its elbow on the main lever, one arm of said elbow lever being formed with bifurcations, the extremities of which are hooked and arranged for engagement with the projecting portions of the bolt, a connecting rod pivotally connected at one end to the other arm of the elbow lever, and a releasing lever fulcrumed on the main lever to which the other end of the connecting rod is secured, said releasing lever being arranged to be swung upwardly, whereby to rock the elbow lever and raise the bolt in the enlarged portion of the slot.

In testimony whereof I affix my signature in presence of two witnesses.

JOHN H. McCLAREN. [L. S.]

Witnesses:
L. B. ARMACOST,
WILL P. STEPHENSON.